United States Patent [19]

Roman

[11] 4,266,912
[45] May 12, 1981

[54] ROTOR BLADE SUPPORT SETUP FOR ROTARY WING AIRCRAFT

[76] Inventor: Stephan Roman, 5 Milford Rd., R.D. 2, Downingtown, Pa. 19335

[21] Appl. No.: 949,277

[22] Filed: Oct. 6, 1978

[51] Int. Cl.³ .............................................. B64C 27/38
[52] U.S. Cl. .................................... 416/141; 416/138
[58] Field of Search .................... 416/141, 138, 134 A

[56] References Cited

U.S. PATENT DOCUMENTS

| | | | |
|---|---|---|---|
| 3,261,407 | 7/1966 | Culver et al. .................... | 416/135 X |
| 3,330,362 | 7/1967 | Kastan ............................. | 416/141 X |
| 4,111,605 | 9/1978 | Roman et al. ........................ | 416/141 |

*Primary Examiner*—Everette A. Powell, Jr.
*Attorney, Agent, or Firm*—Eugene Chovanes; Edward Lovett Jackson

[57] ABSTRACT

A composite bearingless helicopter rotor system utilizes one single and only flexible strap as at least the principal wing support, and also preferably has also a blade pitch shaft. The line of shear centers of the flexible strap, the line of shear centers of the blade pitch shaft, and the pitch axis each lie somewhere along the one straight line, or substantially so.

The cross section of the flexible strap may vary but in each case it is one which is asymmetrical relative to a line through its center of gravity and parallel to the axis of rotation of a rotor, and in each case the line of shear centers of the flexible strap, the line of shear centers of the blade pitch shaft and the pitch axis all are spaced from the line of centers of gravity of the flexible strap. A number of examples of varying specific overall configurations of flex straps and blade pitch shaft will be found described and illustrated herein, of which an example is that in FIG. 15 and the text relating thereto, in which at the leading edge there is a gapped dome in the cross section of the flex strap, following which the cross section comes straight back in legs on both sides with a web straight across between in the further part and the blade pitch shaft is a solid shaft at the trailing edge between the ends of the legs.

6 Claims, 17 Drawing Figures

ROTOR BLADE SUPPORT SETUP FOR ROTARY WING AIRCRAFT

SUMMARY OF THE INVENTION

This invention relates to a support setup on a rotary wing aircraft such as is found for example on helicopters, both in their main and tail rotors, vertical takeoff and landing aircraft, short takeoff and landing aircraft, autogiros and any other type of aircraft that might use a rotary wing.

Numerous efforts have been made, in the support of rotary wings in aircraft such as helicopters, to eliminate pivots or bearings which require costly maintenance and represent potential safety hazards. One effort has resulted in the development of hingeless blade attachements. Such blade attachments are shown in for instance Kisovec U.S. Pat. No. 3,880,551 and Noehren and Hibyan U.S. Pat. No. 4,008,980.

These patents show a composite material, for instance fiberglass, which flexes under the rotation of the rotary wing. Straps of this type are well known in the art and have a high degree of strength while at the same time having a relatively high degree of flexibility about their longitudinal axis. The cross sections of these supporting straps are generally of rectangular shape.

Hingeless rotors in general have the potentiality of reducing the complexity and cost of the rotor as well as improving flying qualities and maneuverability. However, the particular ones involved in the prior art have tended to involve shortcomings in many respects and these shortcomings have among other things tended to prevent them from fully realizing any such potentialities.

The present invention involves a support setup for rotary wing aircraft in which the rotary wings preferably each have a conventional blade with a blade pitch axis about which the angular position of the blade's cross section can be varied, and between the rotor hub and the rotor blade is a single and only flexible strap which constitutes at least the essential support between them and has its line of shear centers at least substantially in a straight line with the blade pitch axis. There is also preferably a blade pitch shaft for varying the blade's angular position and the line of shear centers of the blade pitch shaft is likewise at least substantially on a straight line with the blade pitch axis. Particular suitable and in some cases preferred cross sections of the setup including flexible strap are disclosed, the most preferred being that of FIG. 13 and its variants 14 and 15, with that of FIG. 16 and 17 also among the most preferred, though not as preferred as that of FIG. 13 and its variants.

A purpose of the present invention is to provide a support setup of the type already mentioned which includes a wing which has an especially great dynamic stability.

A further purpose of the invention is to provide such a support setup including a wing with especially low control loads, especially low blade loads, and especially low maintenance cost.

A further purpose of the present invention is to greatly reduce the weight of any such wing by greatly reducing the stresses which it must deal with and thus greatly reducing the total structural mass required to meet those stresses.

A further purpose is to support the blade in a rotary wing in such a manner that the blade is maneuvered into its position throughout its cycle rather than rigidly forced into such a position.

A further purpose is to maneuver the blade into position throughout its cycle by supporting the blade with a single and only flexing strap.

A further purpose is more specifically to provide a rotary wing in which unnecessary vertical and horizontal displacement due to control input is eliminated.

A further purpose is to provide a wing in which there is an especially well established pitch axis and shear center.

A further purpose is to provide such a wing in which there is unusual simplicity of design, reducing the total number of parts required, yet at the same time it is a very effective wing.

A further purpose is to provide such a wing in which there is an especially striking reduction of weight and resultant reduction of cost.

A further purpose is provide such a wing which is especially easy to install on the aircraft.

A further purpose is to greatly reduce the cost of manufacturing the flex strap and rotor hub in and related to such wing.

A further purpose is to provide a suspension and control system for rotary wing aircraft which is especially simple and has an especially low cost of manufacture, including a special simplicity and an especially low cost of manufacture of the flex strap for the rotary wing and of the rotor hub which cooperates with that rotary wing including the flex strap.

A further purpose of the present invention is to provide a rotary wing which is especially adaptable to folding rotor blade configurations.

A further purpose is to provide a rotary wing which has especial flexibility of being adapted for both main and tail rotors.

A further purpose is to provide a rotary wing which is so constructed as to afford especially low blade loads.

A further purpose is to avoid forcing a blade into position during a cycle, but to permit the blade to achieve its natural position under suggestion or guidance from the flex strap supporting member.

A further purpose is to eliminate the additions of extra loads on hubs in the blade and wing of the invention.

A further purpose is to eliminate material in a rotary wing, to decrease the stiffness of the blade and the loads inserted thereto.

A further purpose is to improve the stability characteristics of the wing.

Specific cross-sectional configurations of the setup involving the flex strap will be found in the rest of the description, the drawings and the claims. An example of the most preferable such configuration is one in which two legs which spread away from a central gap between them form the leading edge from a rotational standpoint and gradually curve back to go back parallel to each other, with a transverse web extending between them at a point well in their rear half. In such a configuration, the line of shear centers of the flex strap is at a particular place behind the web, and so is the blade pitch shaft, which can be a solid bar of circular cross section with its line of shear centers in the center. The line of shear centers in this case is on the same straight line to the rear of most or all of the flex strap, and the pitch axis of the blade which is located further out in this same wing assembly is likewise on this same straight line.

Another configuration which is most especially preferred is one in which the cross section is in the form of an I with its web in the longitudinal direction from the stand-point of rotation and the head of the I longer across than its foot. The web has a large cross-sectionally cup-shaped intermediate position in which the blade pitch shaft is located.

Other forms of setup have the flex strap lagging the blade pitch shaft.

One of these which is considered more desirable than the others of this type has the cross section of an elongated lipped somewhat rounded channel whose side opposite the lipped opening is in the direction of wing rotation.

Figure 12:
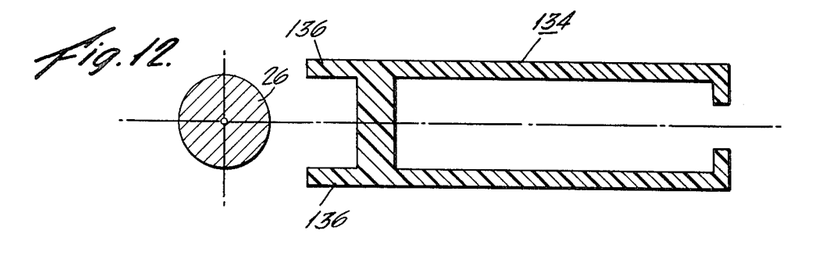
FIG. 12 is like the immediately preceding figures, but with the flexible strap in a cross-sectional shape which is largely that of what might be termed a "high-waisted H" type of configuration lying on its side and extending toward the blade pitch shaft with a lipped opening forming the opposite end.

Other cross sections disclosed for the flexible strap in lagging position include a squared-off elongated lipped channel, a partly squared-off elongated lipped channel, and a C, in each case with the opening away from the direction of rotation, a T with its head in the direction of rotation, and a more complicated variation from the squared-off elongated lipped channel such as found in FIG. 12.

DETAILED DESCRIPTION

Describing certain particular exemplary embodiments in illustration and not in limitation and referring to the drawings:

In the form of FIGS. 1 through 5, which for simplicity of illustration involves a two-bladed rotor 20, the rotor includes hub assembly 22, on which are mounted the flexible strap 24 and blade pitch shafts 26 and 28, with blades 30 and 32 being respectively mounted on the opposite ends of the flexible strap.

Figure 5:
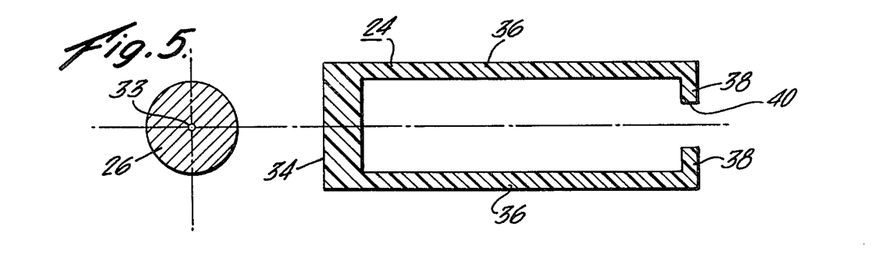
FIG. 5 is still further enlarged section view of the flex strap and blade pitch shaft of the same embodiment taken from a direction such that their direction of rotation is toward the left on the figure.

The blade pitch shafts are in the form of solid bars of circular cross section, each of whose center lines, such as 33 as found in FIG. 5, which center line of course is likewise its line of shear centers, is in prolongation of the pitch axis of blade.

Figures 2, 3, 4:
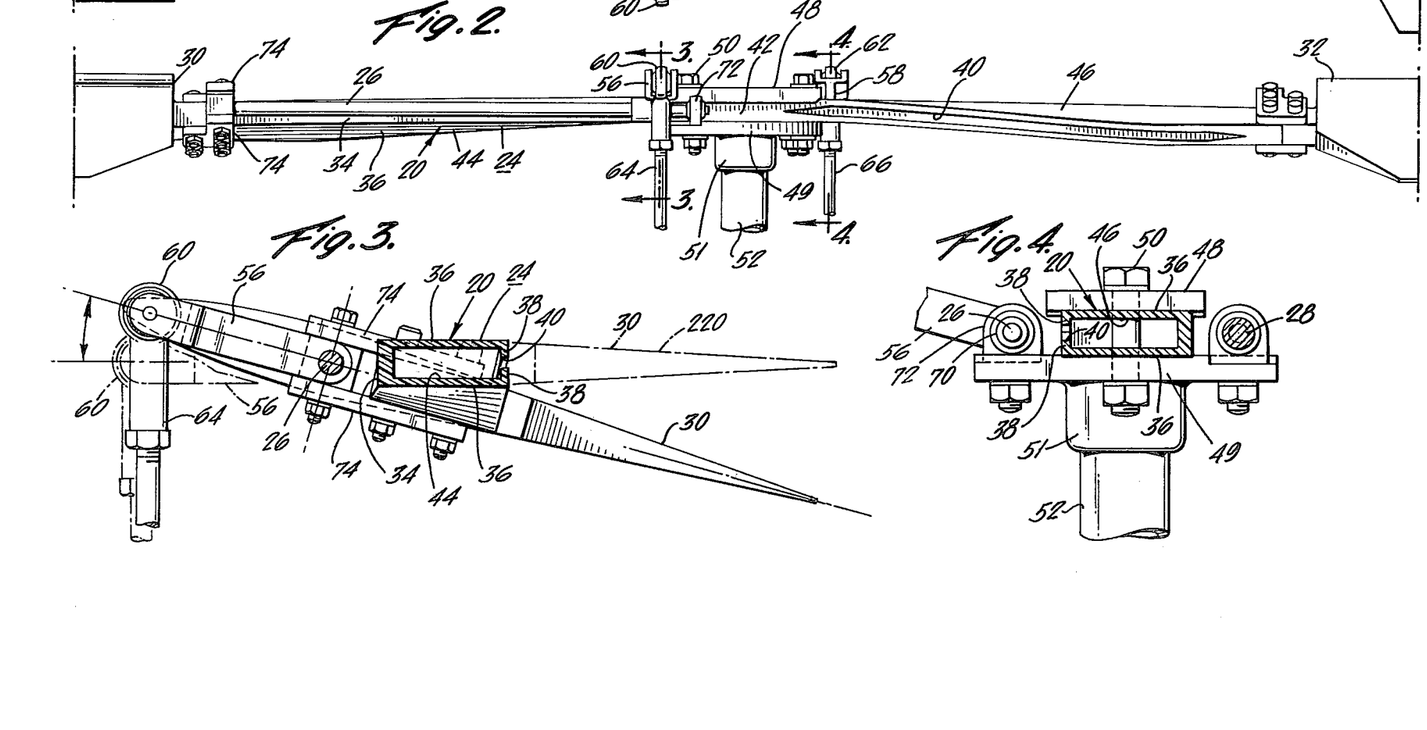
FIG. 2 is a view of the same thing in elevation, without any of it being broken away to form a section.
FIG. 3 is an enlarged sectional view along the line 3—3 of FIG. 2.
FIG. 4 is a similarly enlarged sectional view along the line 4—4 of FIG. 2.

The flexible strap in each effective half as best shown in FIGS. 2 and 5, is in the form of an elongated lipped channel with its forward portion 34 a relatively thick portion in a perpendicularly transverse position located behind the blade pitch shaft, considered from the standpoint of rotational motion. From the two ends of that forward portion two legs 36 extend straight back in thinner section and then at their far ends away from the forward portion turn inwards directly toward each other to form lips 38 of opening 40, each perpendicular to the central axis of the elongated cross section of the strap when that strap is in untwisted condition.

The line of shear centers of the strap, when the strap is in its original untwisted condition, is forward of its leading edge, from the standpoint of rotation, and more particularly exactly coincides with the center line, such as 33, in the center of the solid round pitch shaft, such as pitch shaft 26 in the case of the cross section shown in FIG. 5.

The flexible strap 24, more particularly speaking, has central portion 42, which is rectangular and solid, portion 44 which extends out from there to the left-hand blade 30, and portion 46 which extends out from the central portion to the right-hand blade 32, portions 44 and 46 each being hollow and constructed and oriented as previously described relative to the rotational direction of the blade for that particular portion.

Figure 1:
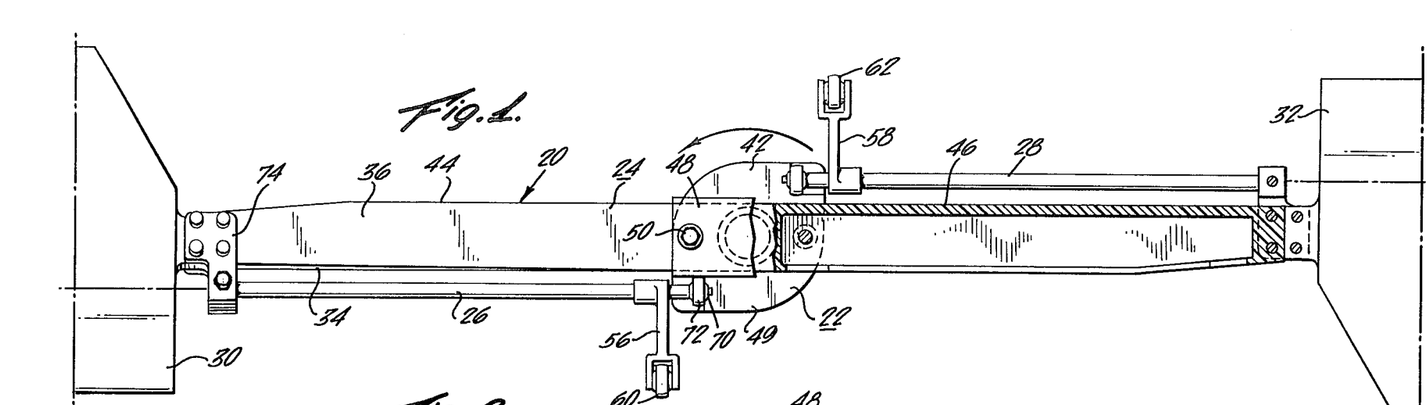
FIG. 1 is a plan view of the portion nearer the rotor hub of a rotor assembly including two wing assemblies, of a preferred embodiment of my invention. It has a single flex strap extending from blade to blade and is partly broken away to a more or less horizontal section of almost all of the part of the particular flex strap which applies to one particular blade.

Hub assembly includes top plate 48 and bottom plate 49, between which the central portion of flex strap 24 is suitably secured, as by bolts, one of which might be 50, and is mounted on head portion 51 of mast 52, as for example by the mast, including its head portion, and the bottom plate all being or being made integrally one piece, as by welding.

The pitch shafts 26 and 28 each have a pitch arm, 56 and 58 respectively, which through a universal joint (60 and 62 respectively) is kept in appropriate angular position for the particular parts of its cycle by a pitch link (64 and 66 respectively).

Blade pitch shaft 26 is mounted at one end on the hub by means of universal joint 70 in ear 72 mounted to extend upwardly from the lower plate of that hub, and a corresponding arrangement is present for blade pitch shaft 28. At the other end, blade pitch shaft 26 is suitably attached to plates 74, which are likewise attached to the far end of flex strap 24 which is toward the left and to the blade 30, with again a similar arrangement for blade pitch shaft 28. Thus through the blade pitch shafts, the pitch angle of the blades is suitably controlled.

Figures 6, 7:
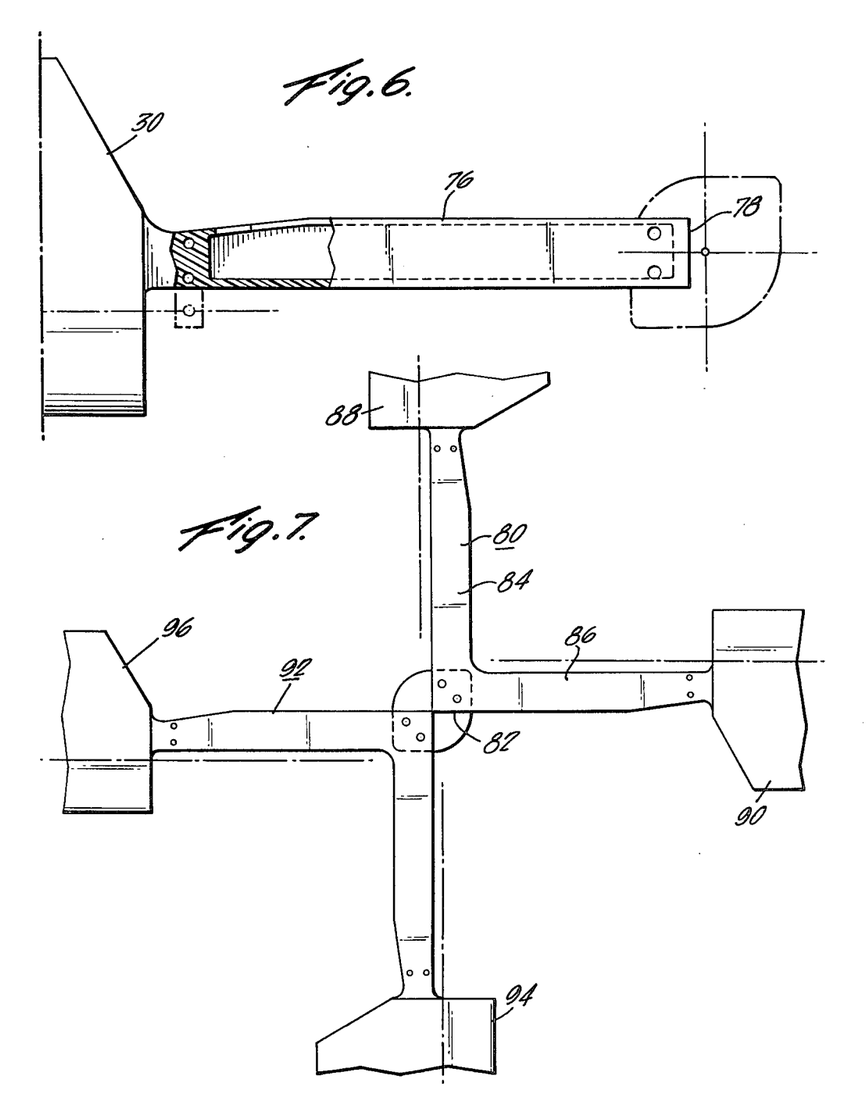
FIG. 6 is a plan view, partly broken away to show a more or less horizontal section of part of a particular variant of what is shown in FIG. 1, eliminating the blade pitch shaft in the left, the top plate in the center and everything which extends to the right of that, including the right hand flex strap, the variant being one which has two separate flex straps, one for each blade, instead of a single flex strap extending from blade to blade, and each is unitary with its blade.
FIG. 7 is a plan view, broken away, of the part nearer the center of a four blade rotor setup, confining the showing to the flex straps, lower plate, and near parts of the blades.

As already indicated, the form of FIG. 6 involves a similar structure, except that instead of one flex strap extending from blade to blade in the case of rotary wing setups involving two blades, it has a separate flex strap for each blade, of which one is shown in FIG. 6 as flex strap 76 extending out to blade 30 from its own opposite end 78 suitably secured to the bottom plate of the hub. As already indicated, in this form each flex strap is unitary with its blade, flex strap 76 for example being unitary with blade 30, as by molding together as a single composite.

As already indicated, in the form of FIG. 7 the rotary wing setup has four blades. More particularly, flex strap 80 having solid central portion 82 and hollow arm portions 84 and 86 at right angles to each other is attached to blades 88 and 90 respectively, and similarly for flex strap 92 and blades 94 and 96 oppositely positioned respectively to blades 88 and 90.

Figure 8:
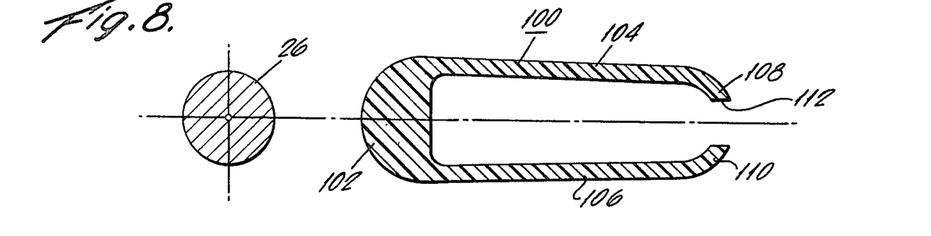
FIG. 8 is a showing like FIG. 5, but of a different embodiment, one involving a rounded long armed lipped channel cross section for the flex strap or in other words a somewhat egg-shaped, instead of the squared long armed lipped channel of the earlier figures, which form of FIG. 8 is one of the more preferred forms, among those having the blade pitch shaft in front.

As already inicated, FIG. 8 shows another setup of flex strap and blade pitch shaft, rather preferred, in which blade pitch shaft 26 is forward of the leading edge of flex strap 100, which in this case has transverse leading edge member 102, rounded in front, legs 104 and 106 going backward and slightly inward from the respective ends of that leading edge member, and far ends 108 and 110 of those legs respectively curving inward toward each other but leaving gap 112 between them. As with the first form and indeed all the forms, the line of shear centers in the flex strap is located along the same straight line as the pitch center line of the blades and the line of shear centers of the blade pitch shaft, or substantially so.

Figure 9:
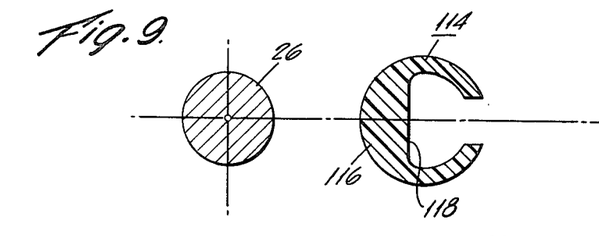
FIG. 9 is a showing like FIGS. 5 and 8, but of a still different embodiment, one involving what might be termed a C section, or an open hollow circular section, or a short armed, rounded channel section, for the flex strap.

In the form of FIG. 9, again the blade pitch shaft, such as 26, is located as before, and the flex strap 114 in this case has a cross section which is more or less that of a C with its continuous back 116 in the direction in which the blade involved is rotating, and that back being thickened by making its interior side 118 straight rather than curved in cross section.

Figure 10:
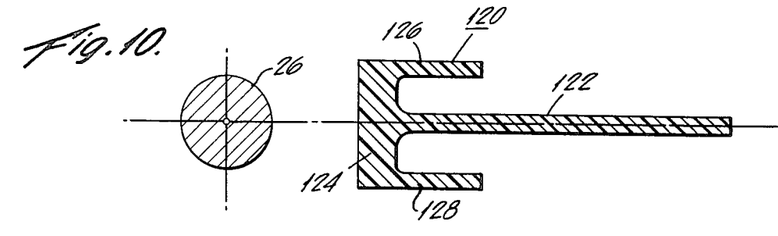
FIG. 10 is a showing like FIGS. 5, 8 and 9, but of another different embodiment, one in which the cross section of the flexible strap is that of a T with the head of the T in the direction toward the blade pitch shaft— —the direction of rotation.

In the form of FIG. 10, the flex strap 120 will be seen to have its cross section in the form of what might be called a rather ornate capital T, with long central leg 122, rather thick cross head 124 as the leading edge, and short legs 126 and 128 extending back part way from the ends of that head. In this form it should be especially noted that the drawings are not necessarily in exact proportion from the standpoint of dimensions, but the blade pitch shaft 26 is especially likely in fact to be proportionally closer to the flex shaft, in order to come as close as practical under a given set of specific parameters to the line of shear centers of the flex shaft.

Figure 11:
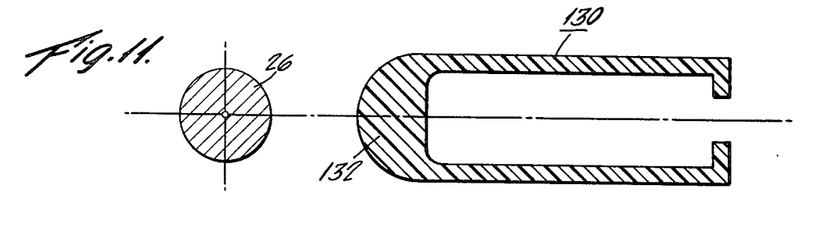
FIG. 11 is like the immediately preceding figures but with the cross section of the flexible strap hollow and mostly rectangular, but with the leading edge rounded and the trailing edge squared off with an opening in the middle.

In the case of FIG. 11, the flex strap 130 is like that in FIG. 5, except that its leading edge member 132 is rounded.

In FIG. 12, the flex strap 134 again is like that in FIG. 5, except that in its case the leading edge also has two comparatively short legs projecting forwardly at its ends, and denominated 136.

Figure 13:
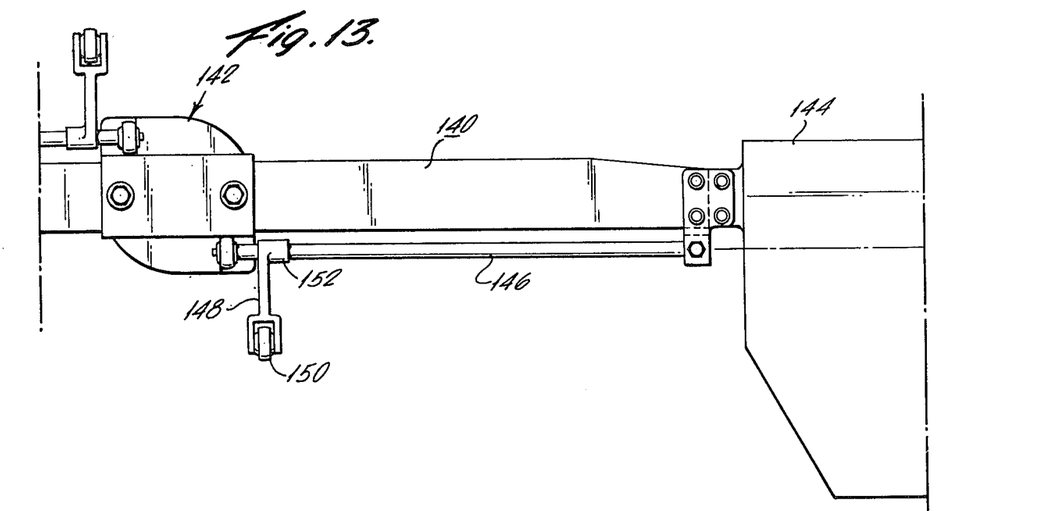
FIG. 13 is a plan view and concerns still another embodiment of my invention, in which the flex strap is in a position which leads its own line of shear centers and the pitch axis and the line of shear centers of the blade pitch shaft, this lead being of course from the standpoint of the direction of rotation of the particular blade and associated parts. This is thought one of the most preferred forms, considerably different from the one earlier mentioned, and much preferred to it.
Figure 14:
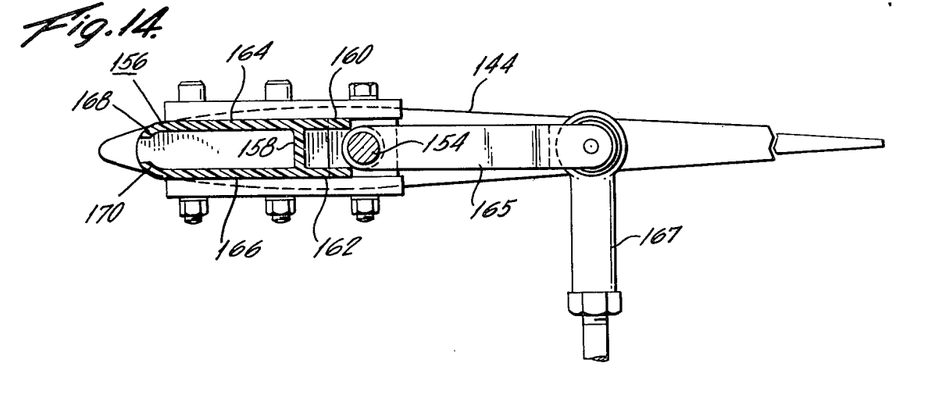
FIG. 14 is a cross-sectional view in an outward direction of a variation of the form of FIG. 13, showing what this variation would look like were such a section taken on a line corresponding to line 14—14 on FIG. 13, but enlarged.
Figure 15:
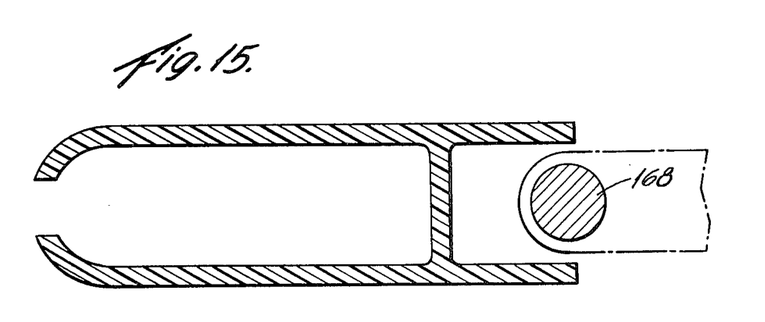
FIG. 15 is a fragmentary enlarged cross-sectional view on the same line as in FIG. 14 of still another variation of the form of FIG. 13.

FIGS. 13, 14 and 15 all show forms in which the flex strap is positioned forwardly, in terms of blade rotation, of the blade pitch shaft, although as before the line of shear centers of the flex strap is located on the same straight line, or at any rate substantially so, as the pitch center line of the blade and the line of shear centers of the blade pitch shaft.

This is shown for example in FIG. 13, where flex strap 140 extends from hub 142 to blade 144 and blade pitch shaft 146 is located behind the flex strap relative to blade rotation, which is counterclockwise. Pitch arm 148 is mounted on universal joint 150 and determines the angle of the blade pitch shaft to which it is attached at 152. In FIG. 13, the blade pitch shaft is entirely behind the flex strap.

In FIG. 14, the blade pitch shaft 154 is mainly behind the flex strap 156, but as will be seen there is a certain amount of overlapping between them. More specifically, the flex strap has member 158 more or less transverse to the direction of rotation, short legs 160 and 162 extending backward from its respective ends, and longer legs 164 and 166 extending forward from those ends and bending in toward each other in end portions 168 and 170, without coming together. Blade pitch shaft 154 has its near middle portion of its cross section extending into the gap between the back ends of legs 160 and 162. Pitch arm 165 extends back from the pitch shaft and is operated by pitch link 167.

In FIG. 15 blade pitch shaft 168 is entirely within the gap between the legs, to a point beyond its center.

In each of the above forms, the overall configuration and positioning of everything is such that the line of shear centers of the flex strap will be on the same straight line as the line of shear centers of the blade pitch shaft and the pitch center line of the blade, or substantially so, this line in these cases being behind all or most of the flex strap.

Figure 16:
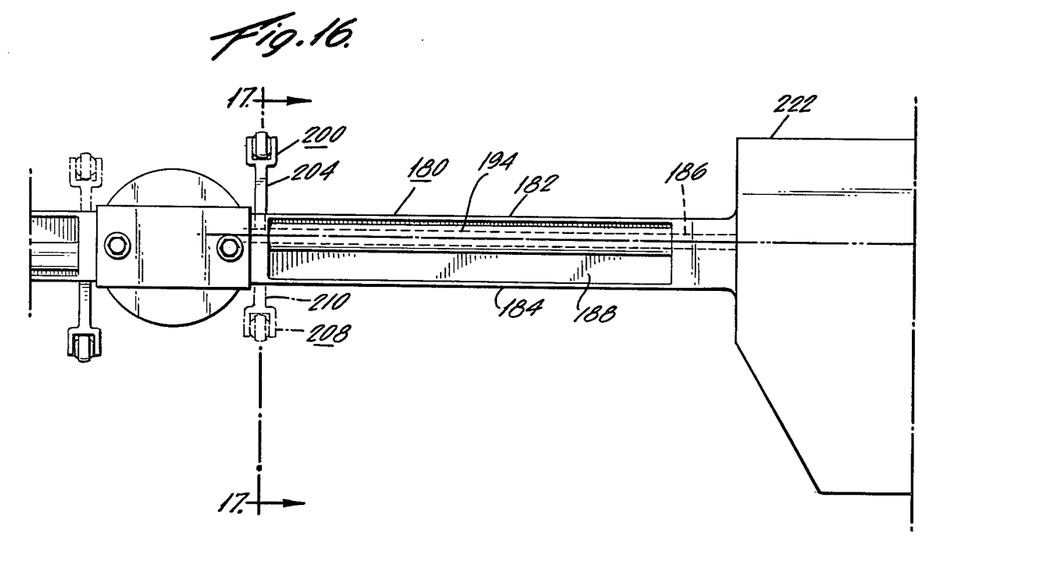
FIG. 16 is a plan view of still another embodiment of my invention, in which the flex strap has its line of shear centers between the ends of the longest cross-sectional distance of the flex strap, which longest distance is the distance between leading and trailing edges from the above standpoint.
Figure 17:
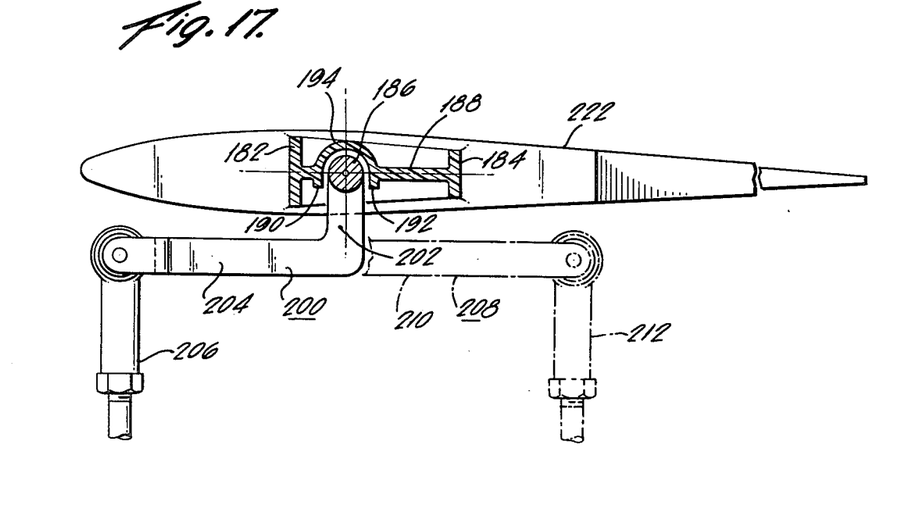
FIG. 17 is a cross-sectional view along the line 17—17 on FIG. 16, enlarged. The form of FIGS. 16 and 17 is also preferred to those earliest mentioned.

In the form of FIGS. 16 and 17, the above is likewise true, but the configurations and positions in question are such that the line is well in between the transverse leading edge and the transverse trailing edge of the flex strap 180. This flex strap 180 here is in the form of more or less an I beam in which transverse leading member 182 is somewhat longer across the transverse trailing member 184. In between, to accommodate pitch shaft 186, web 188 of the I beam is brought around in a downwardly directed groove which in cross section is like an upside down cup, with its downward edges 190 and 192 substantially below web 188 and its dome 194 substantially above that web.

In this case pitch arm 200 is in the shape of an L, with member 202 extending in to the pitch shaft 186 and member 204 extending in a forwardly direction in the situation shown in solid lines in the drawing, and pitch link 206 of course cooperating with the end of member 204. Also shown in dotted lines is an alternative form of pitch arm 208, in which in addition to member 202 extending in, there is a backwardly extending member 210 and cooperation with pitch link 212 at its end.

Incidentally, it should be noted that FIG. 3 shows the setup in solid lines as involving a case where the blade 30 has an angular pitch such as it might have in operation,—a dynamic position, in other words, whereas that same FIG. 3 also shows in phantom the same setup, including the blade, which in this position will be designated 220, in a position which might be assumed when everything was static.

In FIGS. 14 and 17, showing of course different forms as already indicated, the forms are illustrated with the blades 144 and 222 respectively in a static position, with of course the same understanding that in dynamic position the cross sections of the blade would be tilted just as shown in FIG. 3 for the other form of overall construction there found.

As already indicated, the same straight line which in the area of the blade constitutes the blade pitch axis, also in the area of the flex strap and blade pitch shaft constitutes the line of shear centers of both the flex strap and the blade pitch shaft, or at least substantially so.

In the present invention, the flex strap is preferably of a composite material, such as for example is already known in the case of prior art hingeless rotors and the blade pitch shaft can likewise if desired be of composite material. While in the examples the blade pitch shaft is shown as a circular solid bar, it can of course take other forms such as for example one having a hollow cylindrical cross section.

Examples of composites which would be suitable are preferably composed of graphite, or as a second example—a composite of fiberglass.

In operation, the rotor setup, as a result of being rotatably attached to the aircraft through mast 52 and caused to rotate in the counterclockwise direction indicated in FIG. 1, all in some conventional previously known manner, serves as a rotating airfoil partly or completely supporting the aircraft through that mast, as well known for rotary wing aircraft.

At the same time that this is happening, and as a conventional part of the overall process of practical flight, the controls, operating especially through blade pitch link, arm and shaft (such as 64, 60 and 26, respectively for example), control the blade pitch angle in the manner most suitable to the particular support setup on the particular aircraft involved.

The present invention is designed to provide a dynamically stable bearingless and hingeless rotor system with low control loads, low blade loads and low maintenance costs.

Among other things it is designed to reduce control loads, eliminate vertical displacement due to control input, and provide a well established pitch axis for the blade and line of shear centers for the flex strap and blade pitch shaft.

The design is simple, reducing the part count, and the weight and thus the cost is reduced. Ease of installation is promoted and the cost of manufacture of flex strap and rotor hub is reduced. It is adapted to folding rotor blade configurations, and has the flexibility of being adapted to both main and tail rotors. It involves relatively low blade loads.

The lower loads imposed on the control system means that the rotor controls, hydraulic actuators and swash plates which would normally have been used can be replaced with much smaller and lighter ones. This also makes for simplified fabrication of parts and compactness of the whole control system, which at the same time is easily accessible for inspection or repairs. Whole rotor controls lend themselves for installation above or below rotor hub. The various aspects described above also lend themselves to very substantial redcution in costs.

In the claims, where the terminology "rotary wing assembly" is used, what is meant is the part of the total rotor including a blade extending out in the one direction from the hub, in contradistinction to the entire set of blade and their associated structure and the like.

In view of my invention and disclosure, variations and modifications to meet individual whim or particular need will doubtless become evident to others skilled in the art, to obtain all or part of the benefits of my invention without copying the structure shown, and I, therefore, claim all such insofar as they fall within the reasonable spirit and socpe of my claims.

Having thus described my invention, what I claim as new and desire to secure by Letters Patent is:

1. A support for an aircraft provided with at least one rotary wing setup, comprising a rotary hub and a plurality of rotary wing assemblies supporting the rotary hub, at least one of which rotary wing assemblies includes both:
    (a) a blade having a blade pitch axis which blade can be changed in its angular postion about the blade pitch axis, and
    (b) a single and only flexible strap extending between the blade and the rotor hub and furnishing at least most of the supportive effect between them, the flexible strap having a line of shear centers which is at least substantially on the same straight line as the blade pitch axis, the cross section of the flexible strap being asymmetrical relative to a line through its center of gravity and parallel to the axis of rotation of the rotary hub, and the line of shear centers of the flexible strap being spaced from its line of centers of gravity.

2. A support of claim 1 which comprises also a blade pitch shaft forming at least part of means to control the pitch of the blade, which blade pitch shaft is also at least substantially on the same straight line as the blade pitch axis.

3. A support for a rotary winged aircraft comprising a rotor hub and a plurality of rotary wing assemblies attached to the rotor hub, each of which rotary wing assemblies includes:
    (a) a blade having a blade pitch axis, which blade can be set at any of a plurality of different angles around that blade pitch axis, (b) a single and only flex strap extending from the blade to the rotor hub and providing at least most of the supportive effect between them, the flex strap having its greatest cross-sectional dimension approximately in a longitudinal direction relative to the direction of rotation of the particular rotary wing assembly and its line of shear centers at least substantially on a straight line with the blade pitch axis, and its cross section being in the form of an I with its web longitudinal in the above direction and its head longer across than its foot and an intermediate portion in the cross section of a cup positioned transversely to the web, the cross section of the flex strap being asymmetrical relative to a line through its center of gravity and parallel to the axis of the rotation of the rotor hub, and the line of shear centers of the flex strap being spaced from its line of centers of gravity, and (c) a blade pitch shaft located in between the head and the foot in the above cup and having a line of shear centers which is likewise at least substantially on a straight line with a blade pitch axis.

4. A support for a rotary winged airplane comprising a plurality of rotary wing assemblies attached to a rotor hub on the airplane, each of which rotary wing assemblies includes (a) a blade having a pitch axis around which its pitch is designed to be varied, (b) a single and only flexible strap extending between the blade and the rotor hub which single and only flexible strap constitutes at least the main supporting member connecting them to each other, which flexible strap has the cross section of a lipped channel the opening between whose lips is away from the direction of rotation of the blade and whose shear center is on a straight line located off from the channel to the side of the channel away from the opening between its lips which straight line continues along the pitch center of the line of the blade, the cross section of the flex strap being asymmetrical relative to a line through its center of gravity and parallel to the axis of the rotation of the rotor hub, and the line of shear centers of the flex strap being spaced from its line of centers of gravity, and (c) a blade pitch shaft to vary the pitch of the blade which blade pitch shaft has a shear center line coinciding with the shear center line of the flexible strap, the blade pitch shaft being located entirely away to the one particular above-mentioned side from any flexible strap-type support for the blade and that above-mentioned side being the side of the previously mentioned flexible strap which is in the direction of rotation of the blade.

5. A support for a rotary winged aircraft comprising a rotor hub and a plurality of rotary wing assemblies attached to the rotor hub, each of which rotary wing assemblies includes:

(a) a blade having a blade pitch axis, which blade can be set at any of a plurality of different angles around that blade pitch axis, (b) a single and only flex strap extending from the blade to the rotor hub and providing substantially the entire supportive effect between them, the flex strap having a hollow cross section with its greatest cross-sectional dimension approximately in a longitudinal direction relative to the direction of rotation of the particular rotary wing assembly and its line of shear centers at least substantially on a straight line with the blade pitch axis, and the hollow cross section including a cross-sectional dome with a gap in its center at the leading edge and two legs extending straight back on outside joined together internally in their trailing half by a transverse web, the cross section of the flex strap being asymmetrical relative to a line through its center of gravity and parallel to the axis of rotation of the rotor hub, and the line of shear centers of the flex strap being spaced from its line of centers of gravity, and (c) a blade pitch shaft in the form of a bar located entirely behind the web relative to the direction of rotation of the particular wing assembly and the blade pitch shaft having a line of shear centers which is likewise at least substantially on a straight line with the blade pitch axis.

6. A rotor for at least partly supporting an aircraft, comprising a rotatable hub, a plurality of particular flexible straps, each of which can be in prolongation of other of the straps, each extending in a different direction out from the hub and rotating with and helping to support the hub, a plurality of blades each extending out from the end away from the hub of a particular flexible strap and rotating with and supporting that particular flexible strap, each flexible strap being the only flexible strap which extends between that particular blade and the hub and furnishing at least substantially all the support between the blade and the hub, each blade being capable of varying its pitch angle by at least some angular movement around a particular axis known as the blade pitch axis, there being a plurality of blade pitch shafts forming part of the rotor and each extending from the general area of the hub to a particular blade to control the pitch angle of that blade, each blade pitch shaft having a line of shear centers which at least substantially coincides with a prolongation of the blade pitch axis, each flexible strap having a cross section which is uniform throughout at least the greater part of its length, and is asymmetrical both radially around its line of centers of gravity, and also around an axis through its line of centers of gravity and parallel to the axis of rotation of the rotor, and each flexible shaft in any such uniform portion having a line of shear centers which at least substantially coincides with a prolongation of the blade pitch axis and is spaced from its line of centers of gravity.

* * * * *